(12) United States Patent
Gabrielson

(10) Patent No.: US 11,032,392 B1
(45) Date of Patent: Jun. 8, 2021

(54) INCLUDING PRIOR REQUEST PERFORMANCE INFORMATION IN REQUESTS TO SCHEDULE SUBSEQUENT REQUEST PERFORMANCE

(71) Applicant: Amazon Technologies, Inc., Seattle, WA (US)

(72) Inventor: Jacob Adam Gabrielson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/361,098

(22) Filed: Mar. 21, 2019

(51) Int. Cl.
| | |
|---|---|
| *G06F 15/16* | (2006.01) |
| *H04L 29/08* | (2006.01) |
| *H04L 29/06* | (2006.01) |
| *G06F 9/48* | (2006.01) |
| *G06F 9/455* | (2018.01) |

(52) U.S. Cl.
CPC .......... *H04L 67/32* (2013.01); *G06F 9/45558* (2013.01); *G06F 9/4881* (2013.01); *H04L 65/80* (2013.01); *G06F 2009/4557* (2013.01); *G06F 2009/45583* (2013.01); *G06F 2009/45595* (2013.01)

(58) Field of Classification Search
CPC ..... G06F 15/173; G06F 9/4881; H04L 67/32; H04L 65/80
See application file for complete search history.

(56) References Cited

U.S. PATENT DOCUMENTS

| | | | |
|---|---|---|---|
| 6,728,748 B1 * | 4/2004 | Mangipudi | H04L 41/5009 709/226 |
| 7,441,135 B1 * | 10/2008 | Chan | G06F 1/3203 713/320 |
| 7,577,667 B2 * | 8/2009 | Hinshaw | G06F 16/273 |
| 8,190,593 B1 | 5/2012 | Dean | |
| 8,914,497 B1 | 12/2014 | Xiao et al. | |
| 8,953,453 B1 | 2/2015 | Xiao et al. | |
| 9,419,904 B2 | 8/2016 | Xiao et al. | |
| 9,578,087 B1 * | 2/2017 | Kitchen | H04L 67/42 |
| 9,729,557 B1 | 8/2017 | Sanyal et al. | |
| 10,270,886 B1 * | 4/2019 | Postelnik | G06F 8/4435 |
| 2003/0188013 A1 * | 10/2003 | Nishikado | H04L 67/42 709/238 |
| 2004/0044740 A1 * | 3/2004 | Cudd | G06F 16/9574 709/217 |
| 2006/0075084 A1 * | 4/2006 | Lyon | H04L 29/06027 709/223 |
| 2006/0152756 A1 * | 7/2006 | Fellenstein | G06Q 40/04 358/1.15 |

(Continued)

*Primary Examiner* — Hieu T Hoang
(74) *Attorney, Agent, or Firm* — Robert C. Kowert; Kowert, Hood, Munyon, Rankin & Goetzel, P.C.

(57) ABSTRACT

A network-based service may schedule requests received from clients according to information regarding prior requests from the client included the requests. When a request is received at a network-based service, information regarding the request, and possibly other prior requests, may be included in response for the request sent to the client. The client may then include that information in a subsequent request to the network-based service. An evaluation of the information may determine a scheduling decision for the request and the request may then be processed according to the scheduling decision.

20 Claims, 9 Drawing Sheets

(56) References Cited

U.S. PATENT DOCUMENTS

| | | | |
|---|---|---|---|
| 2009/0216580 A1* | 8/2009 | Bailey | G06Q 30/0283 |
| | | | 705/7.27 |
| 2010/0229218 A1 | 9/2010 | Kumbalimutt et al. | |
| 2012/0311674 A1* | 12/2012 | Hockings | G06F 21/6218 |
| | | | 726/4 |
| 2013/0117418 A1* | 5/2013 | Mutton | H04N 21/234309 |
| | | | 709/219 |
| 2017/0091612 A1* | 3/2017 | Gruber | G06F 40/169 |

* cited by examiner

INCLUDING PRIOR REQUEST PERFORMANCE INFORMATION IN REQUESTS TO SCHEDULE SUBSEQUENT REQUEST PERFORMANCE

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments may be implemented across large and complex distributed systems which may include many different systems, services, applications, or devices to provide virtual computing resources. Scheduling requests across such distributed systems can prove challenging as the variety of supported operations and their dependent operations can vary widely. Techniques that improve the scheduling of client requests in such systems may therefore improve the performance of those client applications.

Figure 1:
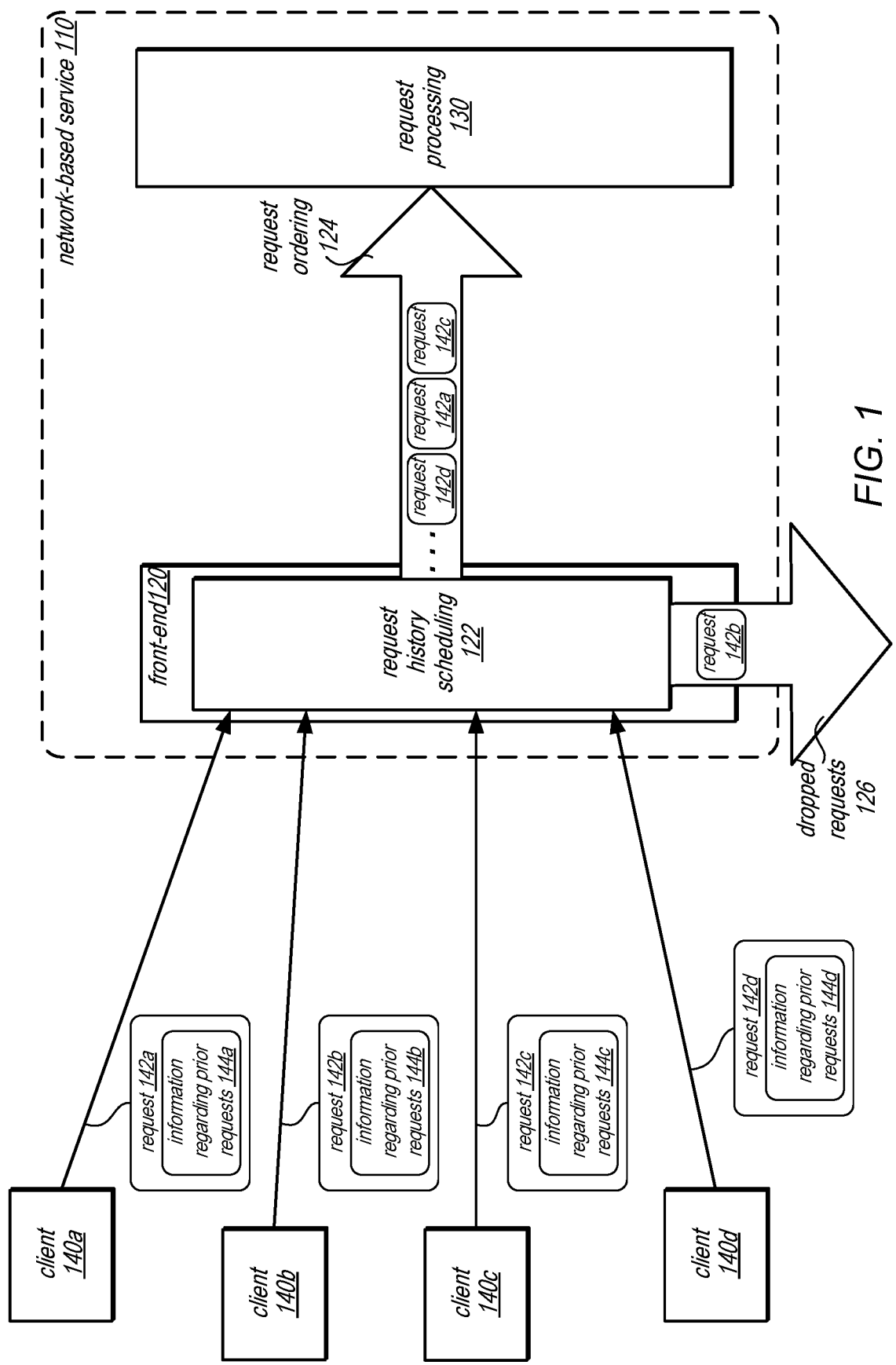
FIG. 1 illustrates a logical block diagram for including information regarding prior requests in requests for scheduling subsequent requests, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Generally, the systems and methods described herein may utilize information regarding prior requests (e.g., quantity, frequency, resource consumption metrics) when scheduling handling of subsequent requests, for example to perform load-shedding in a distributed computing system. Distributed systems may host various resources for performing or implementing different systems, services, applications and/or functions. The resources may be implemented to provide different network-based services located across multiple servers, systems, computing devices, and other computing resources. In order to provide access to these network-based services, requests invoking different operations to perform at a network-based service may be supported.

One challenge in distributed computing is how to perform load-shedding when a particular system is overloaded (or merely becoming overloaded). When the system is not overloaded or becoming overloaded, the behavior is straightforward: a request comes in, and it is handled (typically upon receipt). This works fine as long as the overall system has excess capacity, but stops working once the system starts hitting a limit. What happens at this point may be queueing, where a request comes in, and it cannot be handled right away, so the system has to make a decision about what to do with the request instead. As used herein, "handling" a request refers to routing the request to the appropriate resource(s) within the distributed computing system and causing those resources to perform one or more processing functions to execute a task associated with the request.

The types of decisions that can be made in in this second scenario can range from simply rejecting the request outright, to putting the request onto a FIFO (first in, first out) queue (the oldest request will be serviced next), to putting the request onto a LIFO (last in, first out) queue (the most recent request will be serviced next), or to putting the request onto a priority queue (presuming there's some way to value certain requests over other; possibly based on the customer's value and/or behavior). However, these approaches do not leverage any information about the request itself when establishing queuing order. These approaches may lead to undesirable scenarios such as immediately handling a request for a new job while throttling requests in the middle of an existing job, which may impair customer experience with the distributed computing system service provider.

The disclosed systems and technique address the above-described challenges, among others, by leveraging information about past requests (e.g., other requests made in a customer's current session) to determine how to schedule new requests as they come in. Specifically, for multi-tenant systems where the goal is to maintain reasonable availability even when resources are low, the system should try to handle as many requests as possible without getting overloaded, and also maintaining as much fairness across the user base as possible. This system can use the disclosed scheduling techniques to make sure that busy users don't starve out all of the other users on the system, and also to avoid interruptions and undesirable latencies in the middle of existing workflows. The disclosed techniques address certain challenges in distributed scheduling, for example the challenge of reliably collecting information from multiple servers in real-time (dealing with failures and/or latency for example is very difficult), by encoding prior request data into a token that is passed along with the request. The token can include, for example, information indicating how many requests the customer has made recently, and how expensive those calls were (e.g., did they make a lot of calls that used a lot of downstream resources).

Specifically, the disclosed technology can set up lightweight, optional distributed "sessions" that keep track of the user's recent behavior in order to make better request scheduling decisions. The user can be required to pass along the encoded request token provided in the last response they received. If the user does not send the token with their request, they can get automatically put into the back of the queue (e.g., to prioritize requests associated with existing workflows, rather than throttling existing workflows to permit the system to handle new requests). If the user does send the token, they may get preferential treatment, as the token contains information about their recent request patterns and may help the user avoid getting throttled, or help the user get some service during a high-load period (as opposed to no service).

Consider the following example workflow, which illustrates the disclosed distributed scheduling techniques for a new session. The user initially has no "session", for example because they have not made a request before, or because they lost their token, or because their token is older than a threshold age considered by the system. The user next makes an initial request (e.g., a request to call a particular API). This request can be routed to a particular machine with a queue—whether this machine does the "real" work behind the request depends on the overall design. If the queue is empty, the work can be done right away (or handed off right away). If the queue is not empty, a scheduling decision has to be made about where to put that work item—should it be in the front, back, or somewhere in the middle? Since this is an initial request, the most likely policy would be to put the request at the back of the queue. Most of the time the customer wouldn't notice this anyway, but during times of high load, this scheduling technique could avoid allowing users to jump to the front of the queue by intentionally not using their session token. After their request is handled, the user can get a response back, with this response containing a token (which is signed, dated and tamper-proof; only the servers can have the right material to create a valid token). At this point, the token contains information representing that the user made one request. The token can also characterize whether the server handling the request had to make calls to another service, as the server can pass the token along to that service. That service can "annotate" the token with further information (including recursive information from any services it called). This can give a sense of the "weight" of the request the customer made.

Consider the following example workflow, which illustrates the disclosed distributed scheduling techniques for an existing session. First, the user can make a request and pass along the token they received along with their last response (in implementations in which the toke is updated with every response). Next, the first server to handle the request can send a fingerprint of the cookie asynchronously to an accounting service. This can prevent users from playing back the same cookie repeatedly in a short time frame. Although some implementations may not immediately shut down this behavior, the use of the accounting service can allow the user to be blacklisted or otherwise penalized for malicious behavior. This same accounting service could also be used to catch users who are trying to overload the system with initial requests, e.g. by continually dropping their session token. The information encoded in the token provides a statistical overview of the user's recent behavior, which can be used to determine how their request should be handled (e.g., being throttled, thrown away, handled immediately, placed in the back of the queue, etc.). In this manner, the distributed system can use the state of prior requests to determine how to handle the present request.

Handling or otherwise processing requests at a network-based service may involve scheduling request operations when requests are received that cannot be handled at the time of receipt as a result of currently processing requests. Request queues, for example, may be used to order received requests that are waiting to be processed, in some embodiments. While queuing of requests may result in fairly equitable performance outcomes if all requests were to have the same operations, cost, dependencies, or other factors that may cause differences in request processing performance, many network-based services support a wide range of requests that can handle differently according to the type of request as well as the client making the request. Scheduling techniques that can account for these differences can make significant performance improvements in request processing for both the service and client applications.

In various embodiments, by including information regarding prior requests in a request, scheduling decisions for requests can be made with information that is useful to optimally schedule the requests in order to increase network-based service capacity to serve additional requests. Instead of a centralized data collection and tracking system for tracking request processing performance, including information regarding prior requests within subsequent requests can provide a lightweight and distributed technique for providing information to perform improved request scheduling. In this way, intelligent scheduling decisions can be made without introducing additional latency into the request processing path by checking or confirming scheduling with a centralized authority. Accordingly, request handlers can independently make scheduling decisions that may still provide an optimal allocation of resources to incoming requests.

FIG. 1 illustrates a logical block diagram for including information regarding prior requests in requests for scheduling subsequent requests, according to some embodiments. Network-based service 110 may be one of many different services that provide various computing resources to clients of the network-based service 110. In order to support access to network-based service 110, front-end 120 may be implemented. Front-end 120 may handle requests from clients and direct the requests to the appropriate resources of network-based service 110 for request processing 130. For example, front-end 120 may recognize, interpret, parse or otherwise identify different types of requests for different types of operations to be performed at network-based service 110. Front-end 120 may then forward the request to those resources of request processing 130 that are associated with the request.

As front-end 120 may receive more requests than can be performed at any one time, front-end 120 may implement request history scheduling 122. Request performance history scheduling 122 can schedule different requests for processing at network-based service 110 according to information regarding prior requests information included in received requests. Such information regarding prior requests information may be provided to clients when a previously received request is performed for inclusion in a subsequent request. For example, various different clients, such as clients 140a, 140b, 140c, and 140d, may submit requests, such as requests 142a, 142b, 142c, and 142d respectively to front-end 120 of network-based service. The requests may include information regarding prior requests, such as information regarding prior requests 144a, 144b, 144c, and 144d, which may include information for past requests performed by the client to network-based service 110. Information regarding prior requests 144 may be determined and included in a response to the client for a prior request. Thus when submitting another request 142, clients 140 can include information descriptive of the prior request's processing performance (and other information regarding prior requests if applicable) to be used to optimally schedule request performance according to request history scheduling 122. As discussed below, the information regarding prior requests 144 may be formatted and included in a request in various ways. In at least some embodiments, the information regarding prior requests may be included in a data token.

When requests are received at front-end 120, request history scheduling 122 may evaluate the request for information regarding prior requests information 144. If none exists in the request (not illustrated), then request history scheduling 122 may apply a scheduling technique different than that provided if information regarding prior requests 144 is included (e.g., by placing a request with no information regarding prior requests at a back of a queue of pending requests). If information regarding prior requests 144 is included, then request history scheduling 122 may apply various techniques to make scheduling decisions that may provide an order of processing for requests 142.

For example, request ordering 124 may be implemented by a request queue. When a request is received, a weight or other value may be determined for the request in order to determine where the request belongs within the queue. As depicted in FIG. 1, request ordering 124 may order requests 142d, 142a, and 142c, accordingly for request processing. Some information regarding prior requests information 144 may indicate that a request should be throttled, delayed, or dropped, such as request 142b, as indicated at 126.

Please note that previous descriptions are not intended to be limiting, but are merely provided as an example of including information regarding prior requests in requests for scheduling subsequent request performance. Various components may perform request performance history scheduling using information regarding prior requests included in requests. Different numbers or types of components implement network-based service 110, as well as front-end 120, request processing 130, and clients 140 may be implemented.

This specification begins with a general description of a provider network, which may implement a network-based service that implements including information regarding prior requests in requests for scheduling subsequent requests. Then various examples of a network-based service are discussed, including different components/modules, or arrangements of components/module that may be implemented and which may perform including information regarding prior requests in requests for scheduling subsequent requests. A number of different methods and techniques to implement including information regarding prior requests in requests for scheduling subsequent requests are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
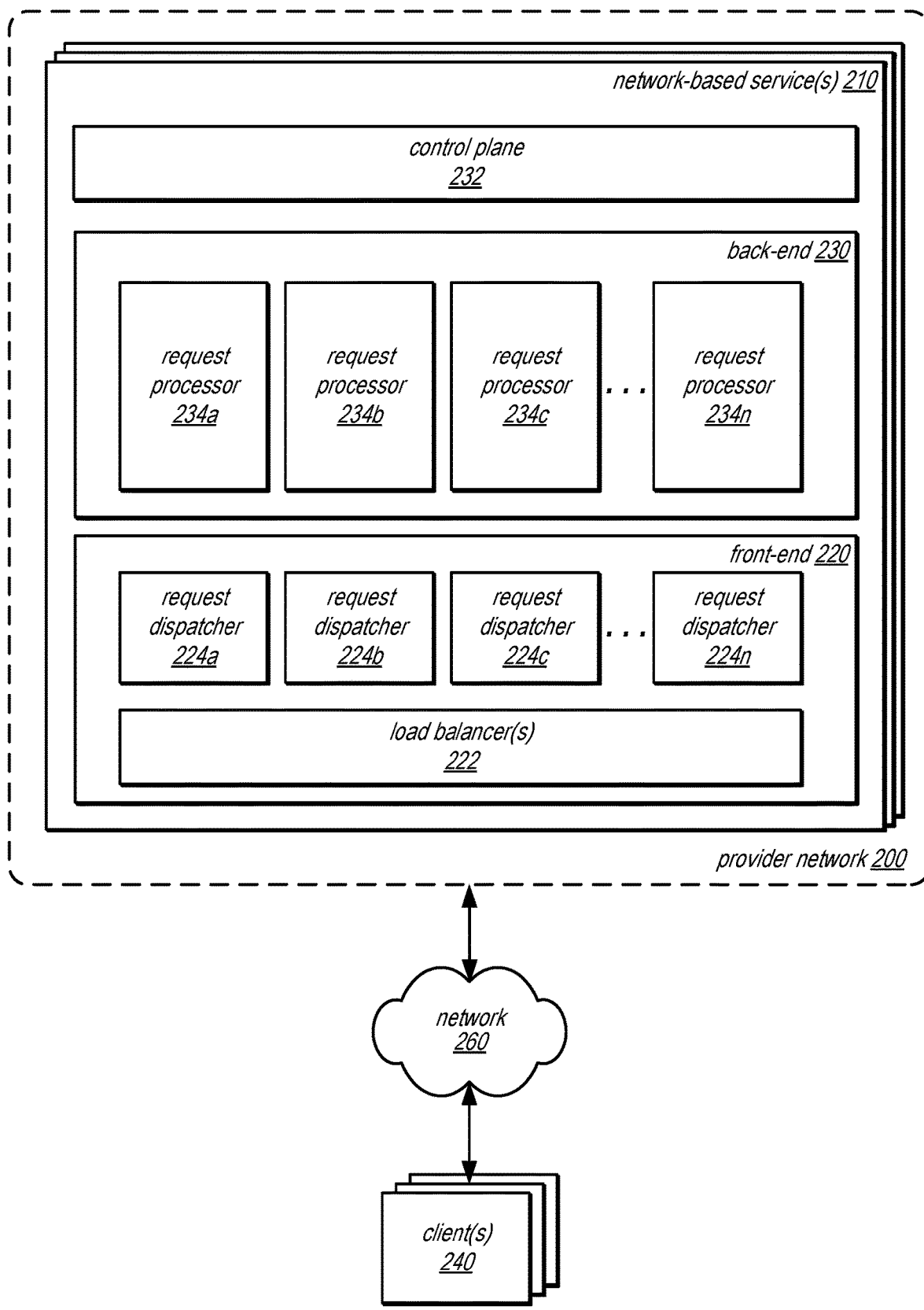
FIG. 2 is a block diagram illustrating a provider network that includes at network-based service that implements including information regarding prior requests in requests for scheduling subsequent requests, according to some embodiments.

FIG. 2 is a block diagram illustrating a provider network that includes at network-based service that implements including information regarding prior requests in requests for scheduling subsequent requests, according to some embodiments. Provider network 200 may be set up by an entity such as a company or a public sector organization to provide one or more services (such as various types of cloud-based computing or storage) accessible via the Internet and/or other networks to clients 240. Provider network 200 may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200. In some embodiments, provider network 200 may provide computing resources, such as those discussed below. Clients 240 may submit various requests to access these various services offered by provider network 200 via network 260. Likewise network-based services or other resources, systems, or devices within provider network may themselves communicate and/or make use of one another as a client application that submits requests to provide different services.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing servers, hosts, systems or nodes (or simply, nodes), in some embodiments, each of which may be similar to the computer system embodiment illustrated in FIG. 9 and described below. In one embodiment, the functionality of a given system or service component (e.g., a component of a front-end 220 or back-end 230) may be implemented by a particular node or may be distributed across several nodes. In some embodiments, a given node may implement the functionality of more than one service system.

Provider network 200 may implement many different kinds of network-based services, and thus the following discussion of various services is not intended to be limiting. For example, various network-based services may be implemented such as deployment service(s), management service(s), application service(s), and analytic service(s). In some embodiments, provider network 200 may implement storage service(s). Storage service(s) may be one or more different types of services that provide different types of storage. For example, storage service(s) may be an object or key-value data store that provides highly durable storage for large amounts of data organized as data objects. In some embodiments, storage service(s) may include an archive long-term storage solution that is highly-durable, yet not easily accessible, in order to provide low-cost storage. In some embodiments, storage service(s) may provide virtual block storage for other computing devices, such as compute instances implemented as part of virtual computing service. In some embodiments, provider network 200 may implement database service(s), which may include many different types of databases and/or database schemes, such as relational and non-relational databases.

Provider network 200 may implement networking service (s) in some embodiments, which may configure or provide virtual networks, such as virtual private networks (VPNs), among resources implemented in provider network 200 as well as control access with external systems or devices. In some embodiments, provider network 200 may implement virtual computing service(s), to provide computing resources. These computing resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor) or machine image. A number of different types of computing devices may be used singly or in combination to implement compute instances, in different embodiments, including general purpose or special purpose computer servers, storage devices, network devices and the like. In some embodiments, clients 240 or other any other user may be configured (and/or authorized) to direct network traffic to a compute instance.

In various embodiments, provider network 200 may implement internal services to provide components to coordinate the metering and accounting of client usage of network-based services, such as by tracking the identities of requesting clients, the number and/or frequency of client requests, the size of data stored or retrieved on behalf of clients, overall storage bandwidth used by clients, class of storage requested by clients, or any other measurable client usage parameter. Provider network 200 may also implement financial accounting and billing service(s), or may maintain a database of usage data that may be queried and processed by external systems for reporting and billing of client usage activity. In certain embodiments, provider network 200 may implement components (e.g., metering service(s)) that may be configured to collect, monitor and/or aggregate a variety of service operational metrics, such as metrics reflecting the rates and types of requests received from clients, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components (e.g., as part of a monitoring service), while in other embodiments such metrics (or relevant portions of such metrics) may be exposed to clients to enable such clients to monitor their usage of network-based services. In some embodiments, provider network 200 may implement components to implement user authentication and access control procedures, such as access management service(s), for provider network 200 resources.

Network-based service(s) 210 implemented as part of provider network 200 may each implement respective interfaces, such as a graphical user interface (GUI), command line interface, and/or programmatic interfaces, such as an Application Programming Interface (API), in some embodiments. For example, requests directed to a virtual computing service may be formatted according to an API for the virtual computing service, while requests to a storage service(s) may be formatted according to an API for storage service(s). Different portions of the various APIs may be exposed to external clients, in some embodiments, with some other portions remaining available to internal clients, such as other network-based services in provider network 200.

Various embodiments of network-based service(s) 210 of provider network 200 may implement front-end 220 to handle requests, such as the request formatted according to the interfaces discussed above. Front-end 220 may include one or more load-balancer(s) 222 which may push requests to a different ones of a pool of request dispatchers, such as request dispatchers 224a, 224b, 224c, and 224n. Request dispatchers may perform initial processing of a request, such as parsing the request to identify the type of request and resources to be involved in its processing, as well as performing initial validity and/or filtering checks, in some embodiments.

Back-end 230 of network-based service(s) 210 may provide a pool of one or more resources (e.g., hosts, servers, nodes, etc.) which may process requests, such as request processors 234a, 234b, 234c, and 234n. Request processors 234 may include application or other software programs and/or hardware components for performing dispatched requests. For example, a request processor 234 may be an instance of a database application that may perform database queries included in a client request.

Back-end 230 may also implement control plane 232, which may manage the operation of network-based service (s) 210 resources, such as request processors 234 and request dispatchers, among others. For example, control plane 232 may handle failure scenarios for request processors in order to ensure that sufficient numbers of request dispatchers 224 and request processors 234 are available. Other features, such as token-based monitoring and priority modeling, discussed below with regard to FIG. 4, may be implemented as part of control plane 232, in some embodiments.

Clients 240 may encompass any type of client configurable to submit requests to network provider 200. For example, a given client 240 may include a suitable version of a web browser, or may include a plug-in module or other type of code module configured to execute as an extension to or within an execution environment provided by a web browser. Alternatively, a client 240 may encompass an application such as a database application (or user interface thereof), a media application, an office application or any other application that may make use of compute instances, a data volume, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 240 may be configured to generate network-based services requests according to a Representational State Transfer (REST)-style network-based services architecture, a document- or message-based network-based services architecture, or another suitable network-based services architecture. In some embodiments, a client 240 (e.g., a computational client) may be configured to provide access to a compute instance or data volume in a manner that is transparent to applications implement on the client 240 utilizing computational resources provided by the compute instance or block storage provided by the data volume.

Clients 240 may convey network-based services requests to provider network 200 via external network 260. In various embodiments, external network 260 may encompass any suitable combination of networking hardware and protocols necessary to establish network-based communications between clients 240 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 240 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 240 and the Internet as well as between the Internet and provider network 200. It is noted that in some embodiments, clients 240 may communicate with provider network 200 using a private network rather than the public Internet.

Figure 3A:
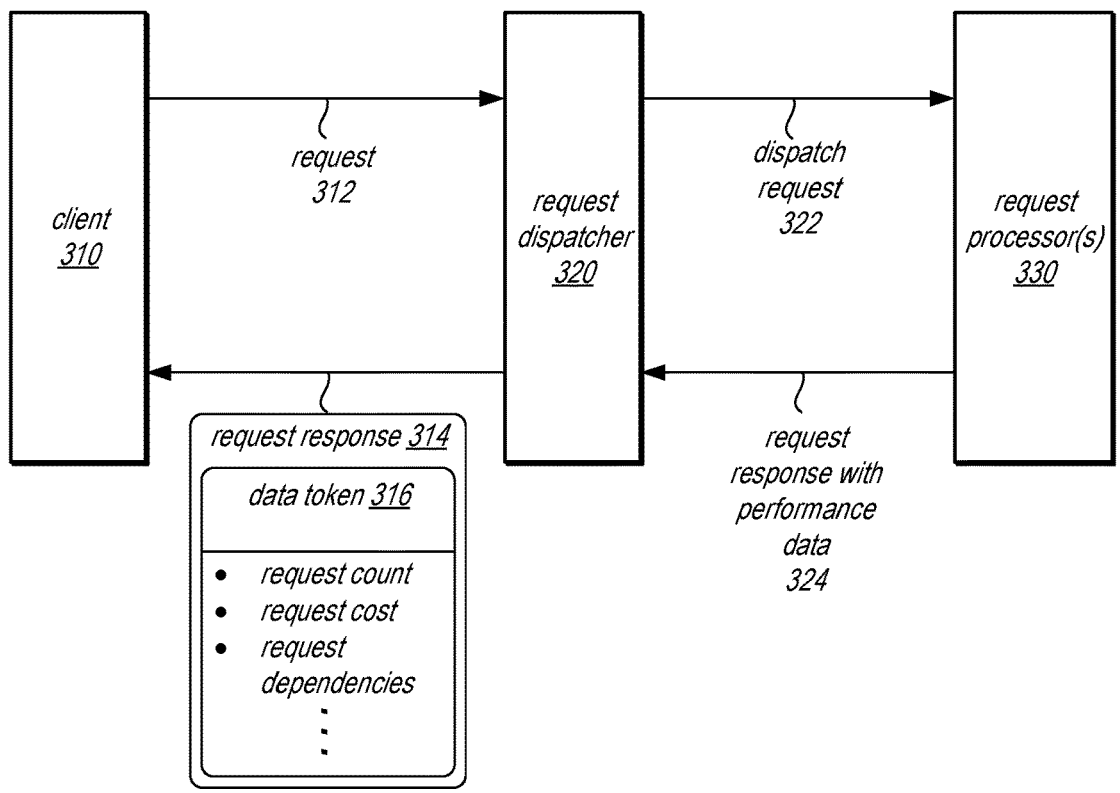
FIGS. 3A and 3B illustrate interactions to include a data token indicating information regarding prior requests, according to some embodiments.

As discussed above with regard to FIG. 1, including information regarding prior requests in requests for scheduling subsequent requests may offer a decentralized and distributed technique for making intelligent scheduling decisions for client requests. Front-end components, such as request dispatchers 224, may handle requests that include such information regarding prior requests information as a data token included in the request. FIG. 3A illustrates interactions to include a data token indicating information regarding prior requests in a request which does not include a data token, according to some embodiments. Client 310, which may be a client 240 that is external to provider network 200 or a client that is implement as part of another service of provider network 200 (e.g., a virtual compute service that makes a request to a storage service describe storage resources accessible to the virtual compute service). Client 310 may submit a request 312 to request dispatcher 320. In some embodiments, a load-balancer (not illustrated) may receive the request between client 310 and direct it to request dispatcher 320, as discussed in the example below with regard to FIG. 6. Request 312 may be formatted according to an interface for the network-based service (e.g., a GUI, command line interface, and/or an API).

As request 312 does not include a data token, request dispatcher 320 may, in some embodiments, place the request at the back (e.g., with lowest priority) in a queue of requests to dispatch (unless there is no queue of previously received requests in which request 312 may not be queued). When ready, request dispatcher 320 may dispatch 322 the request to one (or more) request processors 330 to process the request. The request may include various operations, and as discussed below with regard to FIG. 5, and may invoke multiple different services. Request processor(s) 320 may return a response as well as request processing performance 324 to request dispatcher 320. Request processing performance may include costs such as (time, resource utilization like CPU utilization, network utilization, storage utilization, I/O utilization, and so on.

Request dispatcher 320 may then include in request response 314 a data token 316. Data token 316 may include information for evaluating the priority or order in which subsequent requests from the client should be handled with respect to other received requests, in some embodiments. A data token may include information, such as a request count (e.g., with a value of "1" for the initial request), request cost (e.g., in terms of one or more cost metrics as noted above), request dependencies (e.g., the number and/or identity of services or subsystems upon which the request depends in order to be performed by request processor(s) 330), an account or user identifier (which may be included in requests received from multiple different clients). As discussed below, data token 316 may be encrypted or otherwise encoded, in some embodiments.

Figure 3B:
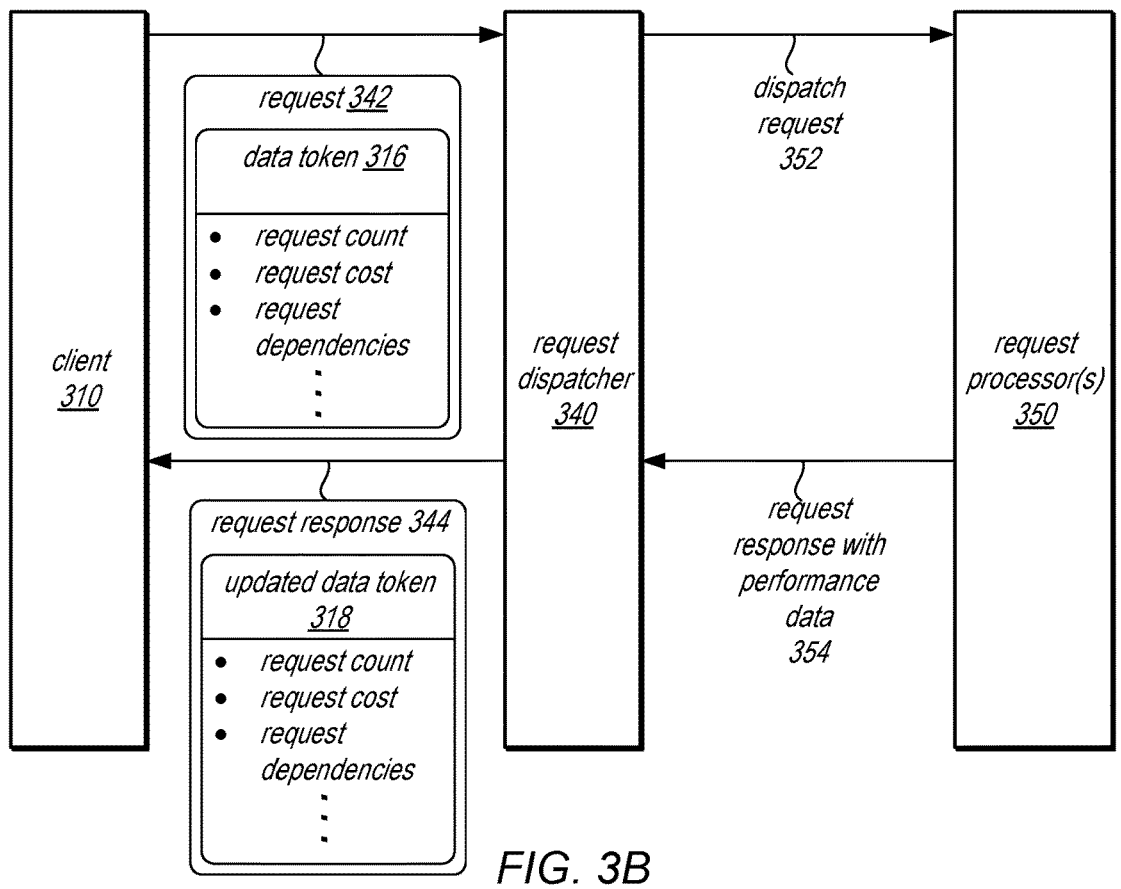

FIG. 3B illustrates interactions when a data token is included in a request that indicates information regarding prior requests, according to some embodiments. Client 310 may submit another request to the network-based service, request 342. The request may include the same data token 316 generated in FIG. 3A. Because multiple request dispatchers may be implemented, a different request dispatcher 340 may receive the request 342 from client 310. However, because data token 316 is the same, request dispatcher 340 may make a similar scheduling decision for request 342 as if the request were received at the previous request dispatcher 320 (although in other scenarios the request may be received at the same request dispatcher, such as those scenarios where a "sticky" session style of interaction may be used).

Request dispatcher 340 may evaluate data token to make a scheduling decision for request 342. If no requests are waiting at request dispatcher 340, then the request may be dispatched, in some embodiments. If requests are waiting, then an evaluation of data token 316 may be made to determine where within a queue of requests waiting to be dispatched request 342 should be placed (e.g., front, middle, back, etc.). For example, as discussed below with regard to FIGS. 4 and 7, a weight or other priority value may be generated for comparison with other queued request priorities to determine a location within the queue, in some embodiments.

Request 342 may be dispatched 352 from request dispatcher 340 to request processor(s) 350 (which may be different than the processors of the earlier request in the illustrated example or the same in other embodiments). Request processor(s) 350 may handle the request, and include in a response information 354 to request dispatcher 340. Request dispatcher 340 may update (or generate an updated version of) data token 318 to include in a request response 344. For example, the request count value may be updated, or request cost may be updated (e.g., if request cost is an average of prior request costs). In scenarios where malicious or erroneous behavior is detected (on the part of client 310 or a user or user account associated with request 342 as discussed below with regard to FIG. 4), information may be included in the updated data token 318 to identify a change in request handling for future requests, such as an indication to delay, throttle or drop subsequent requests that include the updated data token 318.

Figure 4:
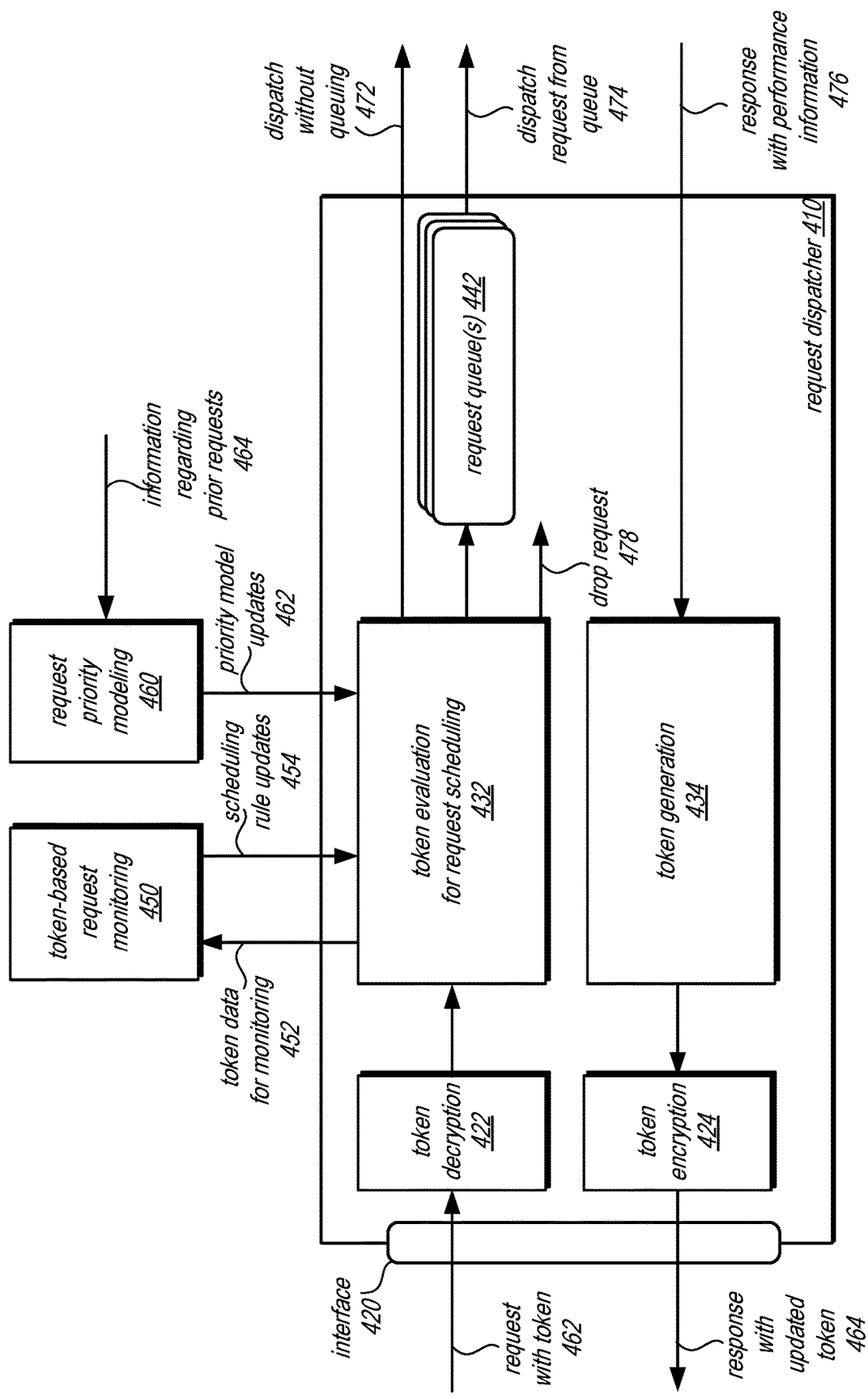
FIG. 4 is a logical block diagram illustrating an example request dispatcher that performs scheduling of requests according to information regarding prior requests indications included in requests, according to some embodiments.

As discussed above with regard to FIGS. 2-3B, a request dispatcher may evaluate information regarding prior requests included in a client request to determine scheduling decisions for client requests. FIG. 4 is a logical block diagram illustrating an example request dispatcher that performs scheduling of requests according to information regarding prior requests indications included in requests, according to some embodiments. Request dispatcher 410 (e.g., similar to request dispatchers 224, 320, and 340 in FIGS. 2-3B) may receive a request with a token 462. The request may be parsed and/or otherwise evaluated at interface 420 (e.g., which may implement a programmatic interface, such as various different Application Programming Interfaces (APIs) to perform different requests) to determine the appropriate destination for the request 462 (e.g., what type or what specific request processor is to receive the request).

Request dispatcher 410 may implement token decryption 422 to decrypt the contents of a data token included in request 462. For example, an encryption scheme to ensure that the contents of a token are private an inaccessible at a client may be used. Alternatively, an encryption scheme, such as a public-private key pair may be implemented to limit modification of the token to a request dispatcher using a private key, but allowing a client to read the information included in the token, using a public key. In this way, client applications could utilize processing performance information included in the token to adapt behavior based on request processing (e.g., increase request retry times if a request is long-running). In some embodiments, different portions of a token could be encrypted using a different encryption scheme so that some, but not all processing performance information (e.g., such as the processing performance information describing the internal service request patterns for a request) is accessible to a client application.

Token evaluation for request scheduling 432 may implement token evaluation and scheduling techniques, in various embodiments. For example, token evaluation for request scheduling 432 may perform the techniques discussed below with regard to FIG. 7 to perform weighting or other priority value schemes by generating a priority value from the information included in the token. For example, a total weight or cost may be generated or determined from a token. A priority model may be implemented in some embodiments to weight and/or combine the various features of a request, such as the processing performance data included in a data token, for determining the total weight, cost, or other priority value. For example, priority value generation function may take as inputs different features in the token (e.g., request count, prior request cost, request dependencies, request type, etc.) to generate a priority value that indicates whether handling of the request should be delayed according to a lower priority or increase according to a higher priority value. The priority value may, in some embodiments, be a score or other probability indication that the request may detrimentally impact operation of the network-based service (e.g., cause an outage, delay to other requests, etc.). In some embodiments, the priority value may indicate a predicted cost for the request.

Request priority modeling 460 may be implemented as part of a control plane for the network-based service (or other separate set of resources) and used to periodically update a priority model 462 according to additional request information 464 that can be used to train or update the priority model. In at least some embodiments, a priority value model may be generated according to machine learning techniques. For example, request priority modeling 460 may apply unsupervised training techniques on various features of previously processed requests. For example, the number of requests dependencies, type of requests, costs of processing requests, errors, outages, or failures of prior requests, among other features may be used to train a classification model that can identify whether a request is high, medium, low, or other grouping of priority classifications. Failure or over utilization classifications may be identified, in some embodiments, which may indicate that requests so classified may be dropped instead of queued or performed, as indicated at 478. Note that numerous other priority modeling techniques may be implemented and thus the previously discussed examples are not intended to be limiting.

Token evaluation for request scheduling 432 may determine a scheduling decision for the request 462 according to the token evaluation, in some embodiments. A scheduling decision may include a decision to drop the request 478, dispatch the request without queuing 472, or store the request in request queue 442 according to an order or priority determined for the request. In some embodiments, different criteria for a request may be considered different scheduling decisions. For example, a request may be dispatched without queuing 472 in the event that request queue 442 is empty. Alternatively, a priority threshold for dispatching requests without queuing 472 may be evaluated so that a request may be dispatched without queuing even if requests are present in request queue 442. Similarly, criteria for dropping requests may, for instance, apply a threshold to identify those requests that should be dropped if not meeting the threshold (e.g., a priority value lower than the dropping threshold) and/or drop requests marked for dropping according to a scheduling rule update 454 that identifies a malicious actor.

Request queue(s) 442 may, in some embodiments, be one or more first-in-first out (FIFO) queues, priority queues or other types of queue or other data structure that allows for different requests to be queued according to a specified ordering scheme (e.g., high priority requests>medium priority requests>low priority requests). In some embodiments, the queue entry representing a request may include the priority value determined for the request so that the priority value may be used to determine the order in which requests are pulled from request queue 442 for dispatch 474. In some embodiments, different request queue(s) 442 may be associated with different delays and/or ordering schemes (e.g., a short delay queue, long delay queue, etc.) which may allow for requests to be dispatched from different queues at different times or in different orders. For example, a request that is determined to be associated with a user account violating a term of service or other malicious behavior may be placed in a queue that throttles such requests for a period of time before being dispatched. In some embodiments, different request queue(s) 442 may be implemented to smooth, average, or provide a similar performance for handling requests (e.g., from a same customer account).

As indicated at 476, a response from request processing may be received that includes processing performance information. Token generation 434 may collect, aggregate, annotate, and/or include additional information (e.g., updating a request count) to the processing performance information. Token generation 434 may then format the information for inclusion in the response. Token encryption 424 may encrypt the token according to the encryption schemes discussed above. The response 464 that includes the updated token may be returned via interface 420, in some embodiments.

In some embodiments, token-based request monitoring 450 may be implemented. As discussed below with regard to FIG. 8, monitoring of token data 452 taken from request dispatcher 410 (and other request dispatchers) may allow for monitoring to be performed based on the processing performance and other information included in the data tokens. For example, token-based request monitoring 450 may allow for the aggregation of processing performance information across users or user accounts in order to detect malicious (or error causing) behavior associated with a group of clients (e.g., associated with a user account). In some embodiments, token-based request monitoring may check for replay patterns where the token is replayed in different requests from the client by comparing a unique identifier included in the token with a prior request from the same client's identifier (which if match may indicate that the token is replayed and not an updated token).

For the examples discussed above and various other throttling or scheduling change events, scheduling rule updates 454 may be issued to request dispatcher 410 (and other request dispatchers) to change the scheduling decisions made for an individual client, user, user account or other grouping of requests. In this way, token-based monitoring may provide a decentralized way of aggregating performance statistics to perform monitoring techniques without intervening directly in the request processing of a request. For example, increasing performance delays or penalties can be added as scheduling rule updates 454 for requests that replay old tokens or perform other request-based malicious behavior. In other example scenarios, scheduling rule updates 454 may be made to adjust the evaluation of tokens to boost request processing performance (e.g., to boost priority of requests for client applications that suffered unrelated processing performance costs because of service side malfunctions which would otherwise lower the priority of the request). In some embodiments, not illustrated, an initial request may include a request to a token-based request monitoring component (e.g., in a control plane) in order to check to see if the client is associated with a black-listed or throttled account, in some embodiments.

In addition to (or instead of) token-based monitoring, token logging may be implemented at request dispatcher 410 (not illustrated), in some embodiments. For example, a copy of tokens or a subset of token data, such as token identifiers or processing performance data, may be included in a log, which may be evaluated to monitor for scenarios, such as replayed tokens or other events as discussed above with regard to token-based monitoring 450 or below with regard to FIG. 8. For example, a log could be searched evaluated for changes in request rate associated with a same client application (or user account), which may trigger an event to throttle requests for the client application (or user account).

Although not illustrated in FIG. 4, similar interactions may be performed with respect to a request that does not include a token. Token evaluation for request scheduling 432 may recognize the lack of a token and make a scheduling decision using an alternative scheduling technique for token-less requests. However, once a response is received with processing performance information at request dispatcher, token generation 434 may generate the token to be encrypted at 424 before being sent in response to the client request.

In some network-based service architectures, no intervening layer between a load balancer and a request processor may be implemented. For example, the front-end of a service may be implemented at the same server or host system as the request processor and thus the service front-end and back-end may be performed at one component (e.g., handling requests from a load balancer, and performing the requests (as discussed above with regard to FIGS. 3A-3B and below with regard to FIG. 5). Therefore, the techniques ascribed to a request dispatcher may be alternatively be implemented at a request processor or at a service that does not implement a request dispatcher separately, in some embodiments.

Figure 5A:
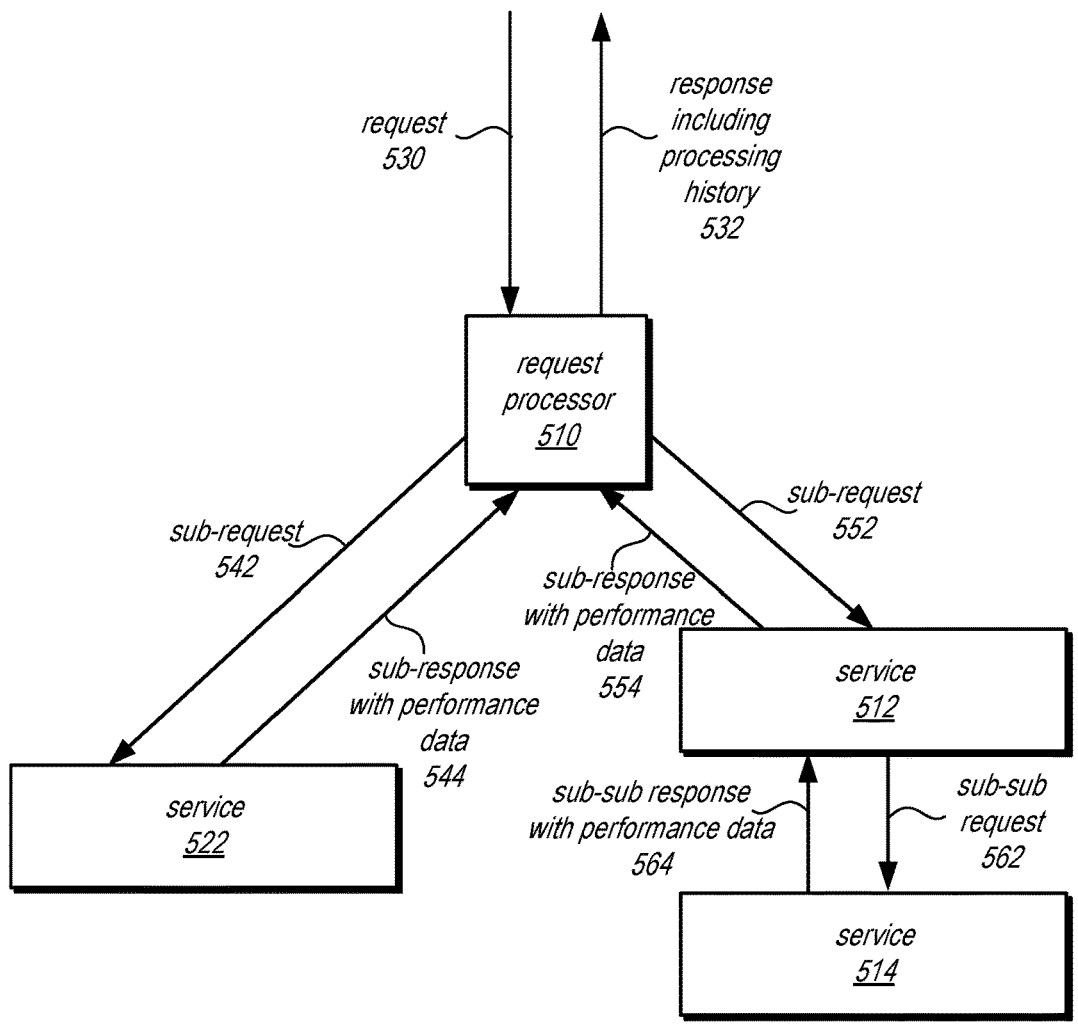
FIG. 5A illustrates an example of request processing utilizing multiple services, according to some embodiments.

While in some embodiments, a single request processor may be able to perform the work in order to process a client request, many network-based services rely upon a service oriented architecture that utilizes other services, such as other provider network services external to the service that received the request, and/or internal services (e.g., a microservice based architecture). FIG. 5A illustrates an example of request processing utilizing multiple services, according to some embodiments. A request 530 may be received at request processor 510. The request may, like requests discussed above with regard to FIGS. 3A-4 may be a request to perform one (or more) operations at the network-based service. Request processor 510 (e.g., like request processors 330 and 350 in FIGS. 3A and 3B) may parse the request 530 to identify the steps or tasks to complete the request.

In the illustrated example, request processor 510 may utilize additional services (which may or may not be implemented within the same service as request processor 510). For example, a sub-request 542 may be sent to service 522 to complete a portion of the request (or operation to allow/complete processing of the request). Service 522 may return a sub-response 544. In at least some embodiments, service 522 may include processing performance information for the sub-request (e.g., time and/or other costs for service 522 to perform the sub-request. Although not illustrated, in some embodiments, the indication of information regarding prior requests may be shared with service 522 when submitting sub-request 542. In this way, service 522 may implement similar scheduling techniques as discussed above with regard to FIG. 4 for its own respective request dispatchers or request processing resources, in some embodiments.

Multiple other services may be used to complete the request. In the illustrated example, in addition to service 522, request processor 510 may submit a sub-request 554 to service 512. As part of performing the sub-request 552, service 512 may also utilize another service, service 514, by submitting a sub-sub request 562 to service 514. The sub-sub response 564 may be included to service 512, which may further include that processing performance data as part of its own sub-response with processing performance data 554 to request processor 510. As discussed above in FIG. 4, request processor 510 may provide a response that includes processing history 532 which may be included in a data token sent in response to a client request.

Figure 5B:
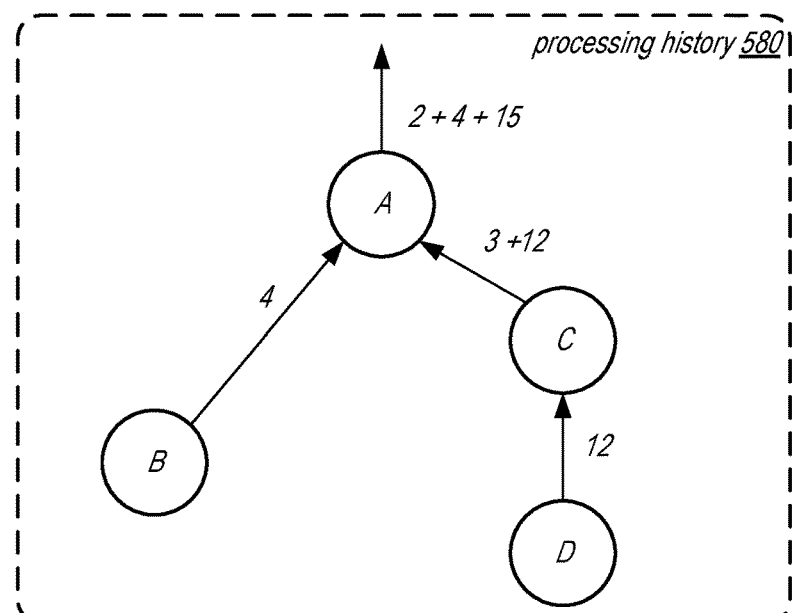
FIG. 5B illustrates an example performance history that describes request processing utilizing multiple services, according to some embodiments.

In scenarios where multiple services or components are utilized, processing history may provide granularity into the costs or history of processing at individual services, in some embodiments. In this way, subsequent evaluations of the processing history to make a scheduling decision can be reprioritize a request if, for instance, one of the identified services is unavailable or perform better (or worse) than expected. FIG. 5B illustrates an example processing history that describes request processing utilizing multiple services, according to some embodiments.

Performance history 580 may include different nodes, A, B, C, and D, which may correspond to different performance components for a request, such as request processor 510, service 522, service 512 and service 514 respectively. In some embodiments, costs may be represented as weights, values, or other indications which may be broken apart or combined. For example, a cost of sub-request 542 indicated in processing history 580 may be "4" whereas the cost of sub-sub request 562 may be "12" and combined with the cost of "3" for sub-request 552. Request processor 510 may include its own cost, "2" in order to provide a total cost of "2+4+15" which totals "21" in the illustrated example. Please note that various combinations of values and not just single values can be used in other embodiments, and therefore the examples discussed above are not intended to be limiting.

Figure 6:
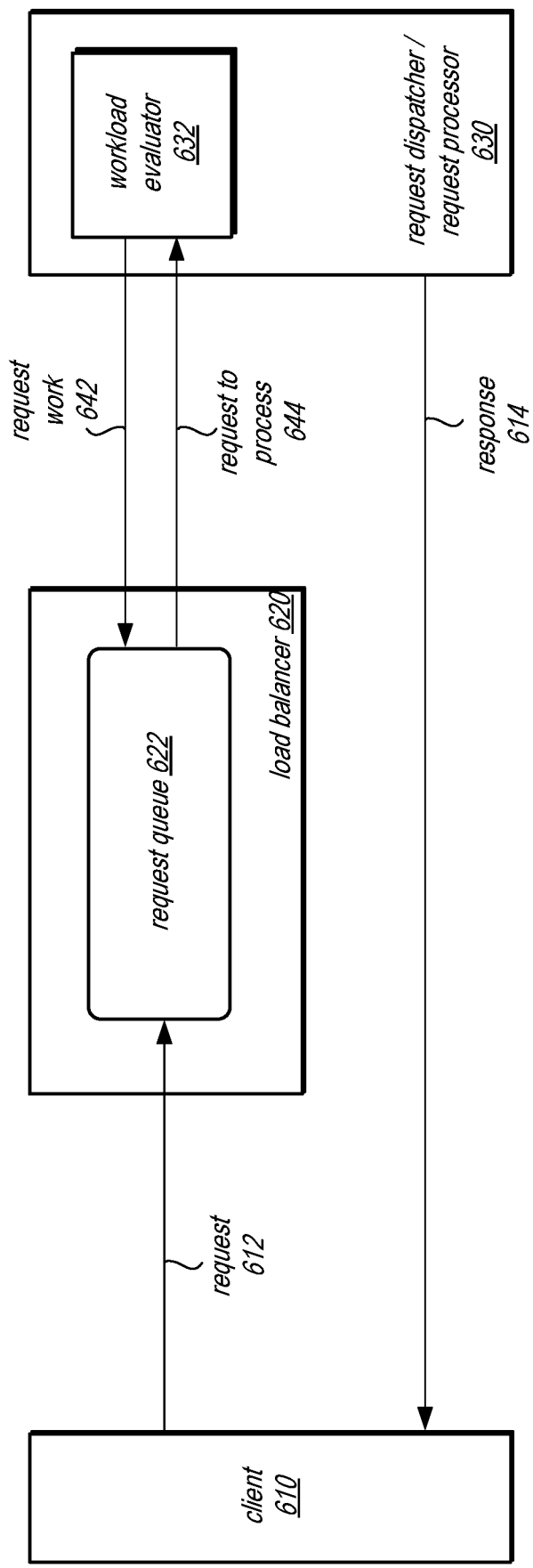
FIG. 6 is a logical block diagram illustrating an example load balancer that queues requests until obtained from the queue for processing, according to some embodiments.

In addition to scheduling requests for processing based on included processing performance history in requests, further improvements in request processing in a network-based service may be implemented. For example, load balancers, as discussed above with regard to FIG. 2, may be implemented to distribute requests to a fleet of service components (e.g., request dispatchers or directly to request processors), in some embodiments. While periodic health checks to determine the availability of service components to handle requests may be implemented, as well as algorithms like least-connections, round-robin and likely more complex algorithms for work allocation, alternative load-balancing techniques may be implemented. FIG. 6 is a logical block diagram illustrating an example load balancer that queues requests until obtained from the queue for processing, according to some embodiments.

In various embodiments, a pull-based load balancing technique may be implemented so that network-based service components can actively pull work—instead of passively receiving it. In this way, network-based service components can pull requests when the component has the capacity to perform the request. Moreover, a pull-based load balancing approach may allow for proportional work distribution based on request processing capacity—allowing for simplified use of heterogeneous computing resources at the request processing tier. Additionally, a pull-based load balancing approach may provide an underdamped system that avoids classical overload.

Client 610, which may be similar to client 310 in FIGS. 3A and 3B, may submit requests to a network-based service to perform one or more operations. The requests, such as request 612, may be sent to a service endpoint (e.g., a public network address) that may direct the request to load balancer 620 for distribution to one of a fleet or group of components to handle the request, such as request dispatcher or request processor (e.g., in architectures where requests are directly dispatched to a processing component or resource without an intermediary) 630. Load balancer 620 may queue the request 612 when received. In some embodiments, a FIFO queue may be implemented. However, in other embodiments, other queuing techniques may be implemented similar to those discussed below with regard to FIG. 7. For example, the load balancer may order requests in request queue 622 according to information regarding prior requests indicated in the requests. In this way, requests may be retrieved to prioritize or schedule the processing of less costly or higher priority requests by virtue of the order in which the requests are obtained from request queue 622, in some embodiments.

Request dispatcher/request processor 630 may implement workload evaluator 632. Workload evaluator 532 may determine from a state of the request dispatcher/request processor 630 (or systems or other services upon which request dispatcher/request processor 630 depends), the workload capacity of request dispatcher/request processor 630, in some embodiments. For example, workload evaluator 632 may be implemented according to a tight integration of the application framework for processing requests (e.g., into the Java Virtual Machine in Java-based scenario) and the operating system. Inside the application layer, an API called getWork( ) may manage or trigger the request for work 642 submitted to load balancer 620. The getWork( ) API may be implemented to block both in the case of waiting for work—as well as on situations of max capacity, in some embodiments. For example, max capacity may be determined by evaluating resources such as operating system state, CPU state, memory state, and/or a dependency queue size (e.g., in a n-tier service oriented architecture as illustrated in FIG. 5A), among other considerations.

Load balancer 620 may then accept requests for work 642, and dispatch requests to process 644 to request dispatcher/request processor 630 when received. For example, directing the request to process 644 to request dispatcher/request processor 630 may be implemented by connecting the incoming socket of the request at the load balancer 620 to an outgoing socket connected to request dispatcher/request processor 630, in some embodiments. Request dispatcher/request processor 630 can then process the request and provide a response 614 to client 610.

In some embodiments, workload evaluator 632 may utilize information regarding prior requests included in requests that are dispatched to request dispatcher/request processor 630 to determine the workload at the request dispatcher/request processor 630. If, for instance, the prior performance information for requests already received at request dispatcher/request processor 630 indicates that the future work to be performed has associated resource costs (e.g., time, CPU, memory, dependencies, etc.), then workload evaluator 632 can determine whether additional capacity is available to request additional work 642.

The examples of a network-based service that implements including information regarding prior requests in requests for scheduling subsequent requests when client requests are received at the network-based service as discussed in FIGS. 2-6 above have been given in regard to a publicly offered service in a provider network (e.g., a virtual compute service). However, various other types of network-based services, which may be privately implemented (e.g., limited to trusted entities), may be implemented and thus may also implement including information regarding prior requests in requests for scheduling subsequent request performance when client requests are received, in other embodiments.

Figure 7:
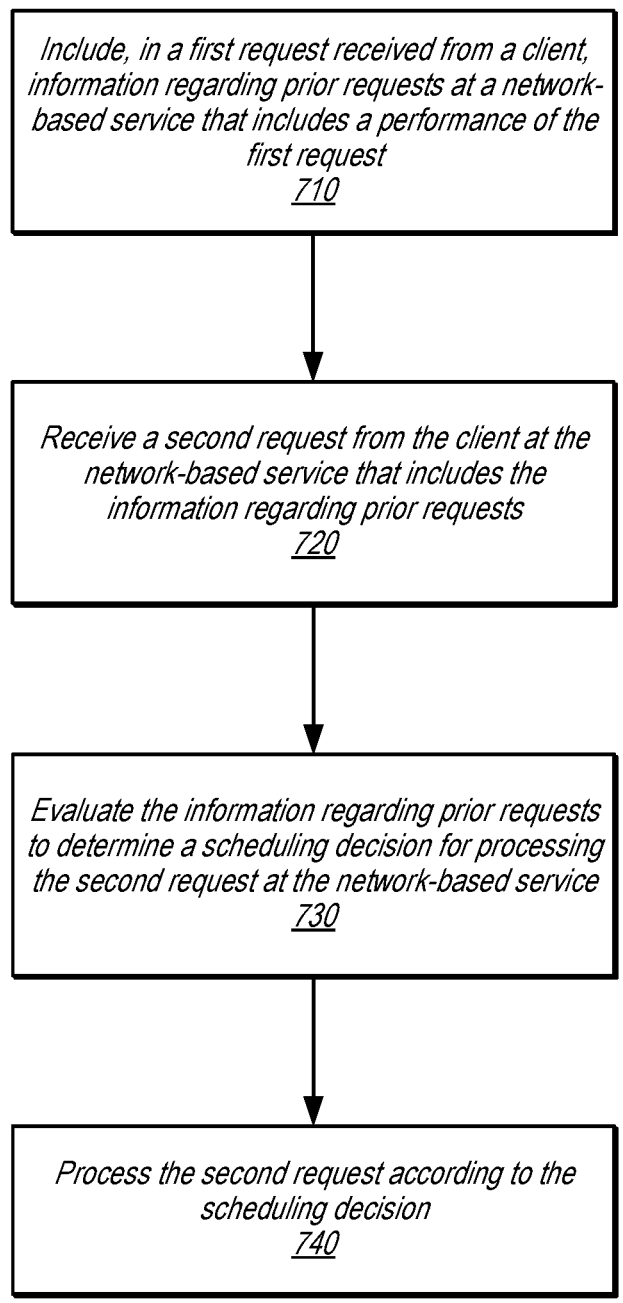
FIG. 7 is a high-level flowchart illustrating various methods and techniques for including information regarding prior requests in requests for scheduling subsequent requests, according to some embodiments.

FIG. 7 is a high-level flowchart illustrating various methods and techniques for including information regarding prior requests in requests for scheduling subsequent requests, according to some embodiments. These techniques may be implemented in network-based service as described above with regard to FIGS. 2-6, as well as other services and/or different implementations of a system, component, application, or device that schedules request processing, and thus is not intended to be limiting as to the other types or configurations of systems that may implement the described techniques.

Client requests may be received at an edge server, application server, or other service component that handles the receipt of client requests (e.g., as part of a front-end or other interface handling layer), in some embodiments. Client requests may be directly received to a request handler (e.g., directed to particular servers, nodes, or hosts according to an identifier like an a network address) or may be indirectly provided to a request handler for the network-based service (e.g., by a load balancer using either a push-based load balancing technique or as discussed above with regard to FIG. 6 using a pull-based load balancing technique). For initial requests to perform an operation or other action at the network-based service (which may exclude requests to establish a network connection or other "set-up" operations in some embodiments), the request may not include any indication of request processing performance information, as discussed above with regard to FIG. 3A.

In such scenarios, different scheduling techniques may be applied (than are applied when information regarding prior requests is included in the request). For example, a First In First Out (FIFO) queue or other scheduling technique may be applied to client requests with prior performance indications in the event that the request cannot be immediately dispatched or otherwise handled. Once processed, information may be collected for the handled requests, as discussed above with regard to FIGS. 3A, 5A, and 5B. Subsequent requests may also be received and returned with updated information, as discussed above with regard to FIGS. 3B and 4.

As indicated at 710, information regarding prior requests at the network-based service may be included in a first request received from a client, in some embodiments. The information regarding prior requests may be the request processing performance of that first request performance alone (e.g., for an initial request) or may be updated request processing performance information that includes the first request and processing performance information for other prior requests, in different scenarios as noted above. In at least some embodiments, the indication may be formatted in a data token (e.g., a "cookie") or other structure that can be embedded in a request message format so that a request handler can parse and identify the information in the data token.

As indicated at 720, a second request from the client may be received at the network-based service that includes the information regarding prior requests, in some embodiments. The request may be a request to perform the same operation, as the first request (and/or one of the requests included for other prior requests in the information), in some embodiments. In some embodiments, the request may be a request to perform a different operation. The information regarding prior requests may be evaluated to detect tampering and/or may be decrypted, in some embodiments, as discussed above with regard to FIG. 4. In some embodiments, a client identifier, account identifier, or other identifier that associates the request may be included as part of the request which may be separate from the information (e.g., an account identifier may be included with request but not as part of the data token).

As indicated at 730, the information regarding prior requests may be evaluated to determine a scheduling decision for processing the second request at the network-based service, in some embodiments. For example, the performance information may include a previously determined number, weight or other priority value which may be generated based on a classification function or other weighting scheme. For example, a classification function may be generated from a machine learning model (as discussed above with regard to FIG. 4) to generate a feature vector that weights or prioritizes performance according to the likelihood that the request may complete successfully or not cause a loss in performance if accepted and or performed by the network-based service. The evaluation may compare the priority value with the priority values of other requests, in some embodiments, to order the performance of the request relative to other requests received at the network-based service, in some embodiments. The indication may include further information, such as a number of previous requests, cost of request, and/or request dependencies, in some embodiments, which may be combined into a single priority value for comparison or may serve as a tie-break or supplemental scheduling decision information, in some embodiments.

Other types of scheduling analysis or refinement of submitted scheduling analysis (e.g., priority values included in the data token) may be performed, in some embodiments. If, for instance, a priority value for request A is lower than request B, but the performance information also indicates a dependency on service C, which is known to be unavailable, then a scheduling decisions for request A may include processing request A before request B because it may be determined that request A is not dependent on the unavailable service (e.g., as may be indicated in the performance information included in the indication), in some embodiments.

A scheduling decision may include decisions to process (without waiting) the request or throttle processing of the request (e.g., by queuing the request) or the dropping, canceling, or otherwise refusing to complete processing to the request), in some embodiments. For example, queuing the request may include placing the request at different locations within the queue according to a priority value (e.g., a weight or other value received and/or determined from the information in the request) or into one of many different queues from which requests are dispatched or otherwise performed differently (e.g., at different time intervals). In some embodiments, a scheduling decision may include dropping, blocking, or returning an error indication without completing processing of the request. For example, the evaluation of the indication of information regarding prior requests may indicate that a projected or estimated cost of performing the request will exceed a capacity of the network-based service to perform the request, in some embodiments. In some embodiments, the scheduling decision may include processing the request without queuing or other delay (which could include skipping ahead of queued requests). For example, queued requests all have high performance costs and the received request may have a very small performance cost less than that of the queued requests, and thus the scheduling decision may allow that request to be processed before the queued requests.

As indicated at 740, the second request may then be processed according to the performance decision, in some embodiments. For example, the request may be stored, inserted, or otherwise input into a queue according to a priority value determined for the request. In some embodiments, the request may be dropped or otherwise processed without queuing as determined by the decision. The request may be dispatched from the queue to a request processor, or in some embodiments, the request may be directly sent to a request processing component (e.g., without an dispatch component) so that requests pulled from the queue are then performed by the receiving component.

Figure 8:
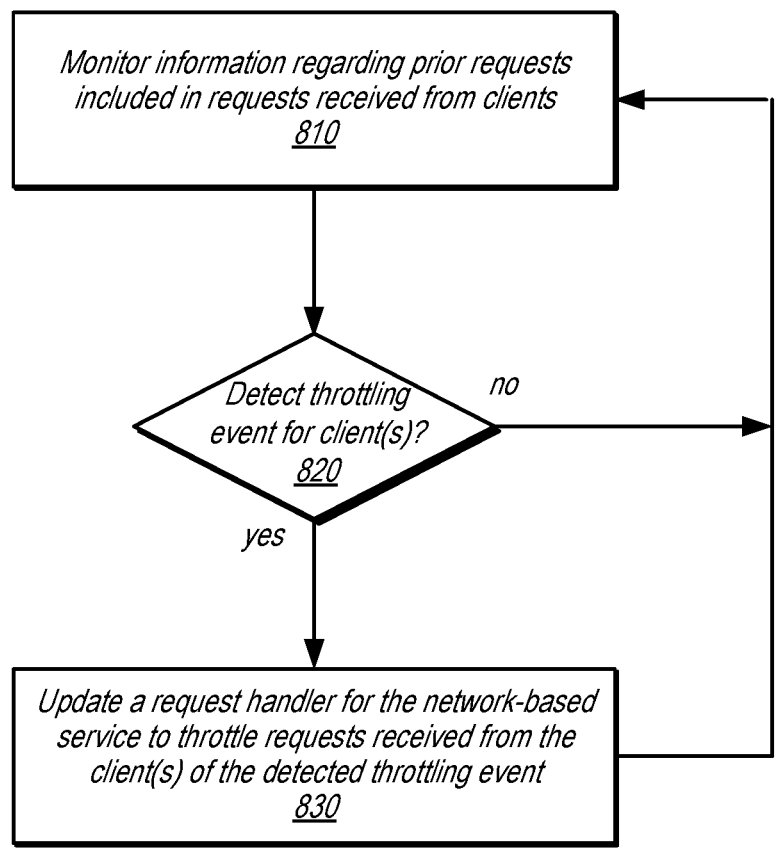
FIG. 8 is a high-level flowchart illustrating various methods and techniques for monitoring information regarding prior requests in requests for throttling events, according to some embodiments.

Including prior request processing history in requests can allow for scheduling decisions for requests to be made based on an expected performance determined from the prior processing history without centrally managing scheduling of requests. Additionally, including the prior performance information can allow for lightweight monitoring of requests for processing abnormalities or other features that may indicate whether a client, user account, or other association of related requests should be throttled or treated differently. For example, monitoring of performance could be used to increase the processing performance of requests from certain clients (or user accounts) by increasing the weighting or priority of those requests with regard to other requests from other clients. FIG. 8 is a high-level flowchart illustrating various methods and techniques for monitoring information regarding prior requests in requests for throttling events, according to some embodiments.

As indicated at 810, information regarding prior requests included in requests received from clients may be monitored, in some embodiments. For example, statistics may be collected for individual clients or aggregated across multiple clients (e.g., all clients associated with user account or group of user accounts). The statistics may include number of requests, types of requests, average performance cost of requests, number of throttled or dropped requests, wait time in queue for requests, among others.

Monitoring of the included information may allow for different events or scenarios that occur because of received requests to be detected. For example, as indicated 820, throttling events may be detected for one or more client(s), in some embodiments. A throttling event may include one or more multiple different criteria which may be evaluated based on the information, in some embodiments. For example, a throttling event may include criteria that evaluate whether the number of requests for a client (or group of associated clients, such as client associated with a user account) in a given time period exceed a threshold number of requests. If the threshold amount is exceeded, then a throttling event for the client may be detected. Similarly, the average (or total) processing time or processing cost of requests may be determined and compared with a threshold for average (or total) processing time or cost to check if the throttling event is detected. In some embodiments, a throttling event could be triggered if a repeat or replay of performance information (e.g., a replayed data token) is received. For example, a unique identifier (e.g., a "fingerprint") for each indication may be included in the indication so that if the identifier is received more than once (as the unique identifier may be tracked or collected for requests from a client), then a throttling event may be triggered.

As indicated at 830, a request handler for the network-based service may be updated to throttle requests received from the client(s) of the detected throttling event, in some embodiments. For example, an edge server, application server, request router, or other component that handles requests (e.g., a request dispatcher in FIG. 2), may have a filtering or scheduling rule updated to identify that requests received from the client(s) of the detected throttling event are to be processed (or not processed) in a specified way. For example, the throttling event may cause all requests (or a percentage of requests) from the client(s) to be dropped, instead of being processed. Alternatively, the priority or weighting of the requests may be reduced, placing the requests further back in the queue (increasing the wait time of requests).

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Figure 9:
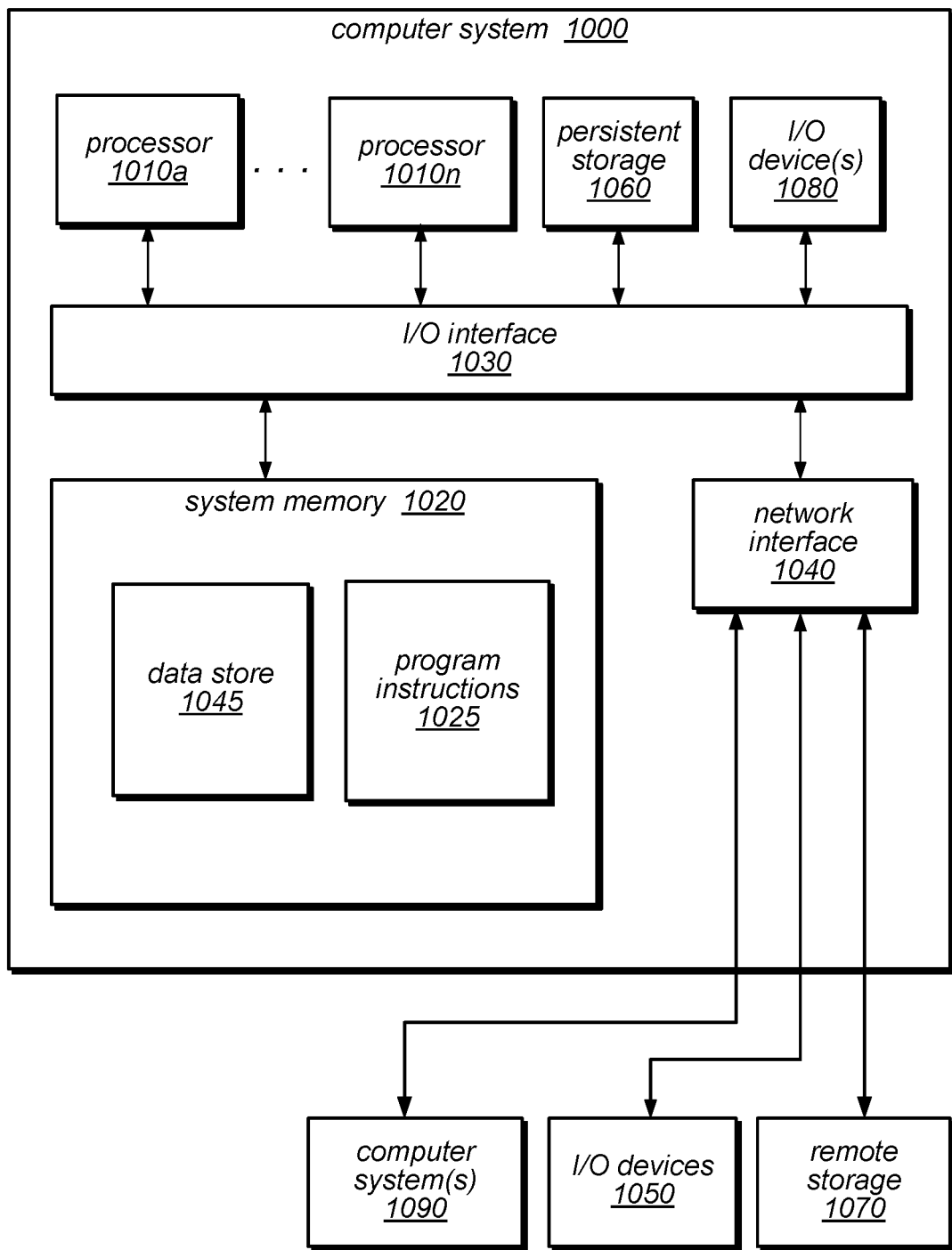
FIG. 9 is a block diagram illustrating an example computing system, according to some embodiments.

Embodiments of including information regarding prior requests in requests for scheduling subsequent request performance as described herein may be executed on one or more computer systems, which may interact with various other devices. FIG. 9 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor and a memory, configured to implement a front-end for processing requests to a network-based service;
   the front-end, configured to:
   receive a first request to perform a first operation at the network-based service from a client;
   dispatch the first request to be performed at the network-based service;
   send a response to the first request that includes a data token comprising information regarding prior requests, including the first request, associated with the client at the network-based service, the information comprising at least one of a processor or storage utilization metric for performance of the prior operations or a frequency of operations associated with the client of the network-based service;
   receive a second request to perform a second operation at the network-based service from the client, wherein the second request includes the data token;
   determine a priority value for the second request at the network-based service according to an evaluation of the information regarding prior requests included in the data token; and
   order performance of the second operation at the network-based service with respect to one or more other requests received at the front-end according to the priority value of the second request.

2. The system of claim 1, wherein the front-end is further configured to:
   send a response to the second request, comprising an updated version of the data token inclusive of the second request by network-based service.

3. The system of claim 1,
   wherein to send the response to the first request that includes the data token, the front-end is configured to encrypt the data token; and
   wherein the front-end is further configured to decrypt the data token received in the second request.

4. The system of claim 1, wherein to order performance of the second request at the network-based service with respect to one or more other requests received at the front-end according to the priority value of the second request the front-end is configured to place the second request in a location in a queue of pending requests according to the priority value of the second request.

5. A method, comprising:
   receiving a request from a client of a network-based service at the network-based service, wherein the request includes information comprising at least one of a processor or storage utilization metric for performance of prior requests or a frequency of prior requests associated with the client of the network-based service, the information generated by the network-based service and provided to the client to include in the request;
   evaluating the information to determine a scheduling decision for processing the request at the network-based service; and
   processing the request according to the scheduling decision.

6. The method of claim 5,
   wherein evaluating the information to determine a scheduling decision for processing the request at the network-based service comprises:
   applying a priority model to one or more features of the information to determine a priority value for the request; and
   determining a location in a queue of pending requests to place the request according to the priority value;
   wherein processing the request according to the scheduling decision comprises obtaining the request from the queue of pending requests according to an order of requests in the queue.

7. The method of claim 6, further comprising updating the priority model based on processing a plurality of prior requests at the network-based service, wherein an evaluation of the information regarding prior requests included in a subsequent request received from the client is performed according to the updated priority model.

8. The method of claim 5, wherein the scheduling decision is a decision to drop the request.

9. The method of claim 5, wherein the information includes an identifier, and wherein the method further comprises:
   comparing the identifier in the request with a second identifier for other information regarding prior requests included in a prior request to determine that the identifier and the second identifier match; and
   applying a scheduling rule to drop subsequent requests received from the client at the network-based service.

10. The method of claim 5, wherein the request is received from a load balancer for the network-based service that placed the request from the client in a queue of received requests, and wherein the method further comprises:
    responsive to determining that capacity to perform a request is available, sending a request for work to the load balancer, wherein the request from the client is sent from the load balancer in response to the request for work.

11. The method of claim 5, further comprising decrypting the information before evaluating the information.

12. The method of claim 5, further comprising sending a response to the request, comprising an updated version of the information inclusive of further information regarding processing of the request by network-based service.

13. The method of claim 12, wherein processing of the request includes different operations performed at a plurality of services and wherein the updated version of the information includes costs and request dependencies for the plurality of services.

14. One or more non-transitory, computer-readable storage media, storing program instructions that when executed on or across one or more computing devices cause the one or more computing devices to implement:

including, in a response to a first request received from a client, information comprising at least one of a processor or storage utilization metric for performance of prior requests, including the first request, at a network-based service or a frequency of operations associated with the client;

receiving a second request from the client at the network-based service, wherein the second request includes the information;

evaluating the information to determine a scheduling decision for processing the second request at the network-based service; and processing the second request according to the scheduling decision.

15. The one or more non-transitory, computer-readable storage media of claim 14, wherein, in evaluating the information to determine a scheduling decision for processing the second request at the network-based service, the program instructions cause the one or more computing devices to implement:

applying a priority model to one or more features of the information to determine a priority value for the request; and determining a location in a queue of pending requests to place the request according to the priority value;

wherein, in processing the second request according to the scheduling decision, the program instructions cause the one or more computing devices to implement obtaining the second request from the queue of pending requests according to an order of requests in the queue.

16. The one or more non-transitory, computer-readable storage media of claim 15, wherein the first request does not include the information and wherein the program instructions cause the one or more computing devices to further implement:

receiving the first request from the client;

responsive to determining that the first request does not include the information, placing the first request at the back of the queue of pending requests; and obtaining the first request from the queue of pending requests according to the order of requests in the queue to process the first request.

17. The one or more non-transitory, computer-readable storage media of claim 14, wherein the program instructions cause the one or more computing devices to further implement:

receiving a third request from the client that includes the indication of information; and responsive to a determination that there are not currently pending requests, dispatching the third request to be performed.

18. The one or more non-transitory, computer-readable storage media of claim 14, wherein the first request is received from a load balancer for the network-based service that placed the request from the client in a queue of received requests, and wherein the program instructions cause the one or more computing devices to further implement:

responsive to determining that capacity to perform a request is available, sending a request for work to the load balancer, wherein the request from the client is sent from the load balancer in response to the request for work.

19. The one or more non-transitory, computer-readable storage media of claim 14, wherein the program instructions cause the one or more computing devices to further implement sending a response to the second request, comprising an updated version of the information inclusive of the second request.

20. The one or more non-transitory, computer-readable storage media of claim 19, wherein processing of the second request includes different operations performed at a plurality of services and wherein the updated version of the information includes costs and requests dependencies for the plurality of services.

\* \* \* \* \*